United States Patent [19]

Pfaendner

[11] Patent Number: 5,116,920
[45] Date of Patent: May 26, 1992

[54] POLYAMIDE-POLYIMIDE BLOCK COPOLYMERS SOLUBLE IN APROTIC DIPOLAR SOLVENTS

[75] Inventor: Rudolf Pfaendner, Rimbach/Odenwald, Fed. Rep. of Germany

[73] Assignee: Ciba-Geigy Corporation, Ardsley, N.Y.

[21] Appl. No.: 470,200

[22] Filed: Jan. 25, 1990

[30] Foreign Application Priority Data

Feb. 1, 1989 [CH] Switzerland ............ 376/89

[51] Int. Cl.$^5$ .............. C08L 79/08; B32B 27/08
[52] U.S. Cl. ................... 525/432; 428/422; 428/423.5; 428/426; 428/443; 428/458; 428/473.5; 525/436
[58] Field of Search ............. 525/432, 436

[56] References Cited

U.S. PATENT DOCUMENTS 3,894,114  7/1975  Lohmann et al.
4,271,079  6/1981  Maeda et al.
4,503,285  3/1985  Darms et al.

FOREIGN PATENT DOCUMENTS 0260709  3/1988  European Pat. Off.

OTHER PUBLICATIONS

C.A. 107:134873 (1987).
C.A. 109:74163.

*Primary Examiner*—Ana L. Carrillo
*Attorney, Agent, or Firm*—JoAnn Villamizar

[57] ABSTRACT

Novel soluble polyamide-polyimide block copolymers having an average molecular weight $M_n$ of 1,000–50,000 and containing radicals of the formula

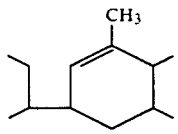

in the polyimide blocks are described. The compounds can be crosslinked by heating to give insoluble products.

13 Claims, No Drawings

POLYAMIDE-POLYIMIDE BLOCK COPOLYMERS SOLUBLE IN APROTIC DIPOLAR SOLVENTS

The present invention relates to novel polyamide-polyimide block copolymers (described below as PAPI block copolymers).

PAPI block copolymers are known per se and are described, for example, in DE-A 2,342,464. Owing to their good electrical, thermal and/or mechanical properties, they are suitable for use, for example, as matrix resins for the production of composite materials, as coating resins in the electrical and electronics industries, as flexible laminating resins, as spread adhesives or as compression-moulding materials. Conventional PAPI block copolymers are insoluble or only slightly soluble in organic solvents, as is known, for example from U.S. Pat. No. 4,503,285. In order to utilize the good properties of the PAPI block copolymers, it is therefore generally necessary to start from the readily soluble precursor, the polyamide-polyamic acid block copolymers. This procedure is not satisfactory in many respects. Firstly, the soluble precursors are, as a rule, only stable on storage to a limited extent, since the amount of water formed by cyclization results in a degradation of the molecular weight and/or the cyclization results in precipitation of the polymer. If, in addition, the imidization is carried out only during processing, the resulting product can exhibit defects, such as holes and/or bubbles, as a result of the water which escapes.

There is, therefore, a desire for soluble PAPI block copolymers which do not have these disadvantages. Polymers of this type have already been described in JP-A 62/30.121 and in EP-A 260,709. The previously known compounds are characterized by the use of tetranuclear aromatic diamine units in the polyamide blocks and the polyimide blocks and by the presence of polyamide-imide units in the polyimide blocks.

Soluble PAPI block copolymers of this type have advantages in processing and can be stored virtually indefinitely in the form of solutions or solids. On the other hand, PAPI block copolymers which are soluble in organic solvents have the disadvantage of being attacked by such solvents. A soluble PAPI block copolymer which, after application from solution, can be stabilized in a subsequent step against attack by solvents is, therefore, desirable.

It has now been found that this object can be achieved by the incorporation of 5-(2,5-diketotetrahydrofurfuryl)-3-methyl-3-cyclohexene-1,2-dicarboxylic acid units (described below as DMCD) into the polyimide block. As a rule, a crosslinking of the copolymers according to the invention takes place surprisingly rapidly.

DMCD is known from EP-A 9,645. This publication also describes the preparation of polyimides having DMCD as the carboxylic acid component. Polyimides of this type cannot generally be crosslinked by heat. It was, therefore, surprising to find that selected PAPI block copolymers can be crosslinked by heat.

It has also been found that the PAPI block copolymers according to the invention can be dried at high temperatures approximately up to the glass transition point, which leads to advantages in their preparation and purification. Surprisingly, the difference between maximum possible drying temperature and minimum possible curing temperature is small, so that technical advantages in use result.

The present invention relates to soluble polyamide-polyimide block copolymers having an average molecular weight $M_n$ of 1,000–50,000, particularly 10,000–40,000, which have a ratio of amide to imide groups of about 4:1 to 1:4, these polymers in the polyimide blocks having a content of at least 2 mol %, in particular at least 5 mol %, of radicals of the formula

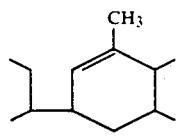

(DMCD radicals), relative to the content of all carboxylic acid radicals in the copolymer. The content of DMCD radicals in the PAPI block copolymers according to the invention is, as a rule, 2 to 80 mol %, relative to the content of all the carboxylic acid radicals in the copolymer. Preferred PAPI block copolymers contain combinations of blocks of the formulae IIb together with Ia and/or Ic or of the formulae Ib together with IIa and/or IIc

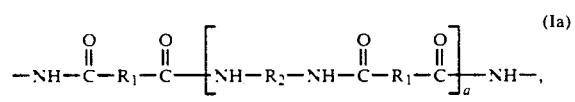
(Ia)

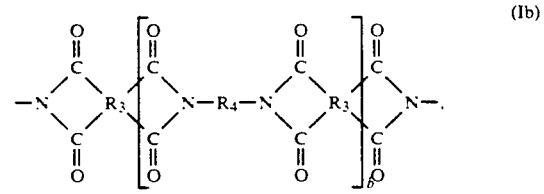
(Ib)

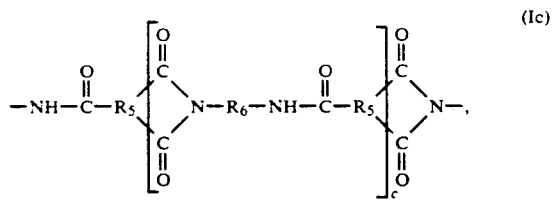
(Ic)

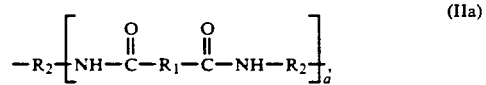
(IIa)

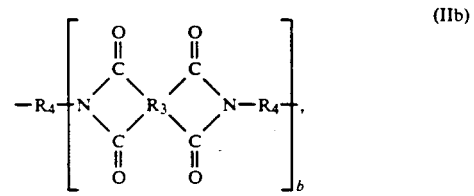
(IIb)

-continued

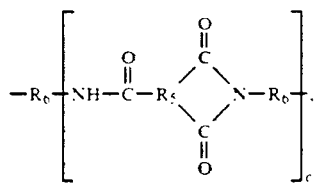
(IIc)

in which the indices a, b and c independently of one another are integers from 1 to 100, $R_1$ is a radical of the formulae $-C_nH_{2n}-$,

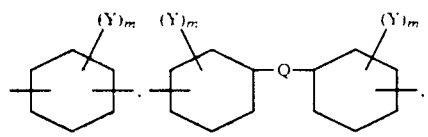

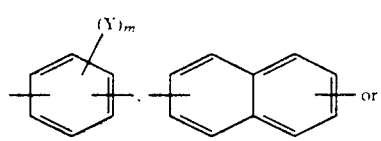

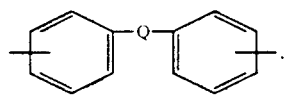

n is an integer from 2 to 12, m is an integer from 0 to 4, Y is alkyl or halogen, Q is a direct bond or $-CH_2-$, $-CH_2-CH_2-$, $-CH(CH_3)-$, $-C(CH_3)_2-$, $-C(CF_3)_2-$, $-O-$, $-S-$, $-SO_2-$ or $-CO-$, $R_2$ is a radical of the formulae $-C_nH_{2n}-$,

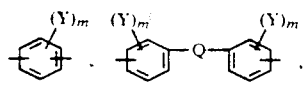

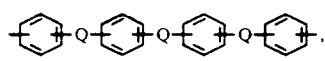

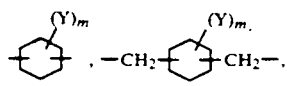

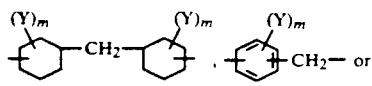

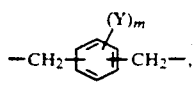

n, m, Y and Q have one of the meanings defined above, $R_3$ is a radical of the formulae

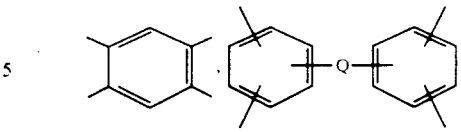

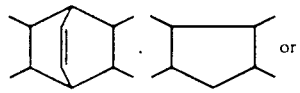

Q has one of the meanings defined above, $R_5$ is a radical of the formula

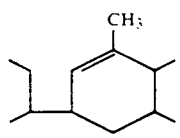

and $R_4$ and $R_6$ independently of one another have one of the meanings defined for $R_2$, with the proviso that 25-100 mol % of all the radicals $R_3$ have the formula

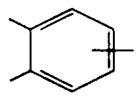

The term "soluble PAPI block copolymer" is, in general, to be understood as meaning a copolymer which is soluble in dipolar, aprotic solvents and from which solutions containing at least 5% by weight, particularly at least 10% by weight, of PAPI block copolymer, relative to the solution, can be prepared.

The ratio of polyamide blocks to polyimide blocks and/or polyamide-imide blocks in the copolymers according to the invention is determined, in general, by the desired solubility of these copolymers in dipolar, aprotic solvents and by the crosslinking density in the desired end product. The proportions of each of these blocks are so chosen that the block copolymer is soluble in dipolar, aprotic solvents and, in the crosslinked state, is virtually not attacked by these solvents. The preferred ratio of amide groups to imide groups in the copolymers according to the invention is 4:1 to 1:4. The average molecular weights $M_n$ of the polyamide blocks Ia and IIa or of the polyimide blocks Ib and IIb or of the polyamide-imide blocks Ic and IIc are, in general, 300 to 20,000, particularly 500 to 10,000.

Typical representatives of the PAPI block copolymers according to the invention have glass transition points of up to 300° C.

As well as the combinations of two blocks mentioned above, the PAPI block copolymers according to the invention can also have three-block combinations of the formulae IIb and IIc and Ia or Ic or the formulae Ia, Ib and Ic or the formulae Ia, Ic and IIb or the formulae Ib, Ic and IIa. Preferred PAPI block copolymers according to the invention consist essentially of combinations of the blocks Ia and IIb or of the blocks Ib and IIa.

The index n is preferably 6 to 12 and the index m is preferably 0 or 1, especially 0.

An alkyl substituent Y in the above formulae can be branched or, preferably, linear. Linear $C_1$–$C_6$alkyl is preferred. Examples of these are methyl, ethyl, n-propyl, n-butyl, n-pentyl and n-hexyl. Methyl is particularly preferred.

As halogen, Y is preferably chlorine or bromine.

Examples of $R_1$ in the above formulae are 1,3-phenylene, 1,4-phenylene, 2,4-tolylene, 1,5-naphthylene, 1,8-naphthylene, 2,6-naphthylene, 4,4'-biphenylene,

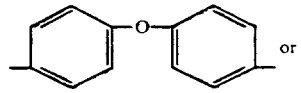
or
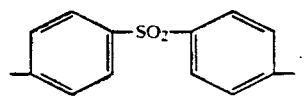

The preferred radical $R_1$ is 1,3-phenylene.

Examples of $R_1$, $R_2$, $R_4$ or $R_6$ as a group —$C_nH_{2n}$— are 1,2-ethylene, 1,2-propylene, 1,3-propylene, 2,2-propylidene, 1,4-tetramethylene, 1,5-pentamethylene, 1,6-hexamethylene, 1,7-heptamethylene, 1,8-octamethylene, 1,9-nonamethylene, 1,10-decamethylene, 1,12-dodecamethylene, 2,9-decamethylene or 2-methyl-1,5-pentamethylene.

As a group

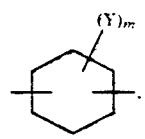

$R_1$, $R_2$, $R_4$ or $R_6$ can be 1,2-cyclohexylene, 1,3-cyclohexylene or, preferably, 1,4-cyclohexylene.

Further examples of specific cycloaliphatic groups $R_2$, $R_4$ or $R_6$ are the following

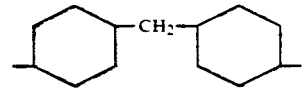

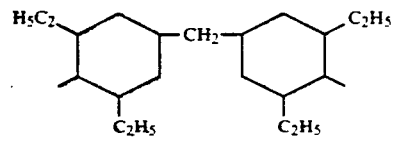

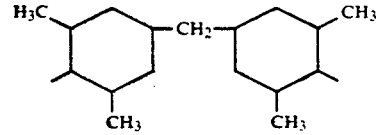

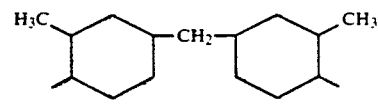

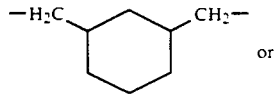

or

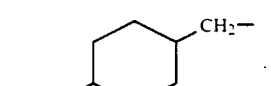

Examples of specific araliphatic groups $R_2$, $R_4$ or $R_6$ are 2,5-xylylene,

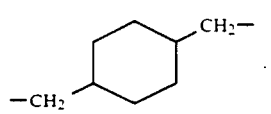

or

Examples of specific aromatic groups $R_2$, $R_4$ or $R_6$ are 1,2-phenylene, 1,3-phenylene, 1,4-phenylene, 2,4-tolylene, 4-chloro-1,3-phenylene, 2,5-dichloro-1,4-phenylene or one of the following groups

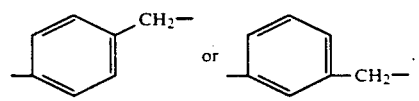

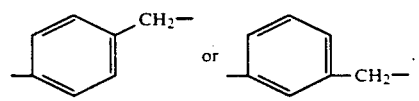

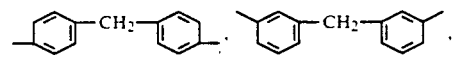

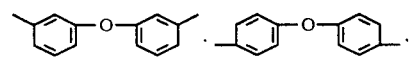

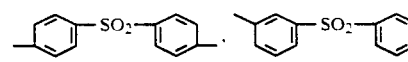

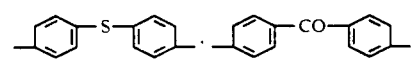

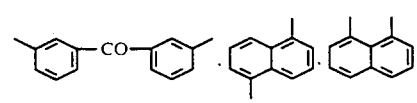

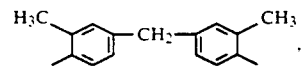

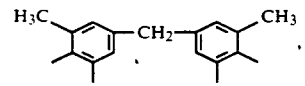

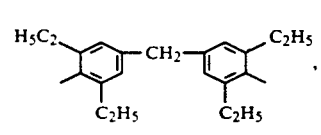

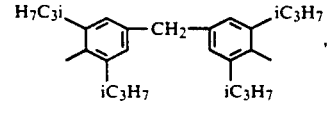

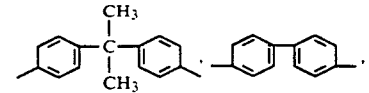

-continued

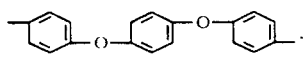

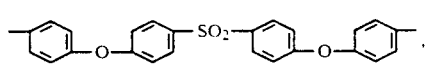

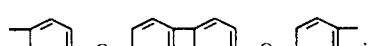

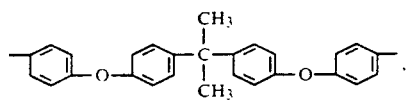

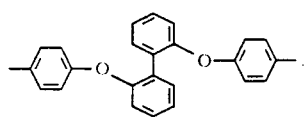

Preferred radicals $R_2$ and/or $R_4$ and/or $R_6$ are 1,3-phenylene.

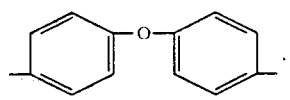

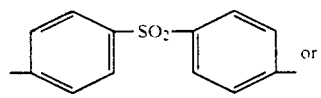 or

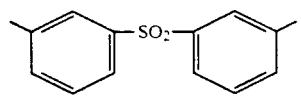

It has been found that the heat stability of the PAPI block copolymers according to the invention is particularly good if they contain a high proportion of aromatic radicals. PAPI block copolymers containing only aromatic or araliphatic radicals in addition to the DMCD radicals $R_3$, for instance those enumerated above as examples of $R_1$, $R_2$, $R_4$, $R_5$ and $R_6$, are therefore preferred.

A bridge member Q in the radicals $R_1$, $R_2$, $R_3$, $R_4$ or $R_6$ is preferably —CH$_2$—, —C(CH$_3$)$_2$—, —O—, —SO$_2$— or —CO—.

Several bridge members Q present in a radical $R_2$, $R_4$ or $R_6$ can be identical or different.

The tetravalent radical $R_3$ is derived from a tetracarboxylic acid capable of forming a dianhydride. Radicals of the formulae

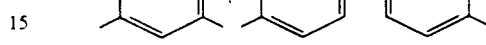

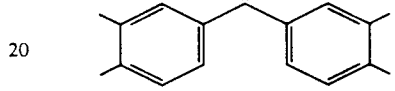

and very particularly

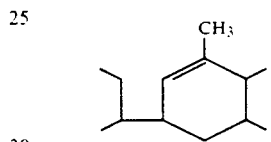

are preferred in this regard.

The proportion of DMCD radicals in the polyimide blocks of the compounds according to the invention is preferably 50 to 100 mol %, relative to the proportion of the tetracarboxylic acid radicals in these blocks.

$R_5$ is preferably a radical of the formula

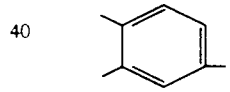

The preparation of the block copolymers according to the invention is effected in a manner known per se and can, for example, be effected by one of the procedures described in DE-A 2,342,464 by reacting preformed polyamide, and polyamic acid blocks and subsequently cyclizing the polyamide-polyamic acid.

Another method of preparation comprises the reaction of polyamic acids of the formula IIIa and/or IIIb

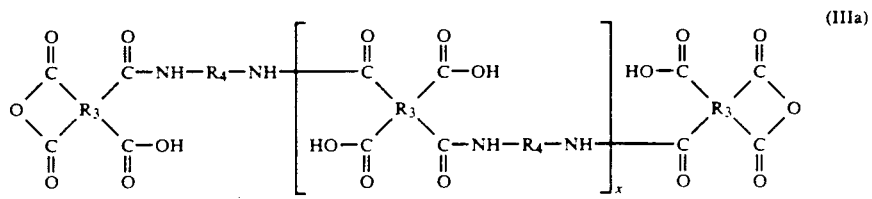

(IIIa)

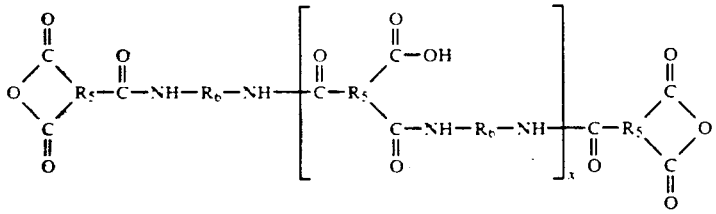

with diamines of the formula IV

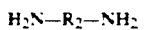

and with dicarboxylic acid chlorides of the formula V $$Cl-OC-R_1-CO-Cl \qquad (V)$$

and the subsequent cyclization of the polyamide-polyamic acid block copolymers thus obtained. In the formulae IIIa, IIIb, IV and V the symbols $R_1$, $R_2$, $R_3$, $R_4$, $R_5$ and $R_6$ are as defined above and x is an integer $\geq 0$, preferably $\geq 1$.

The preparation of the polyamic acids of the formulae IIIa or IIIb is also known per se and is effected, for example, by reacting tetracarboxylic anhydrides of the formula VIa or tricarboxylic anhydrides VIb or a corresponding tricarboxylic anhydride-chloride

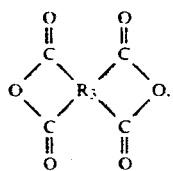

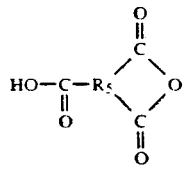

in which $R_3$ and $R_5$ are as defined above with a less than equivalent amount of a diamine of the formula IV.

The starting materials of the formulae IV, V, VIa and VIb are known per se and are in some cases available commercially.

The preparation of DMCD dianhydride

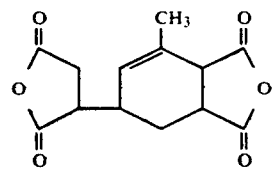

is disclosed in
EP-A-9,645 and can be effected by reacting 3-methyl-4-cyclohexene-1,2-dicarboxylic anhydride with maleic anhydride.

The average molecular weights of the individual blocks can be adjusted to a desired value by selecting suitable reaction conditions, for example by suitable selection of the molar ratios of the reactants. This selection is known per se to those skilled in the art.

The polycondensation of the di-, tri- or tetra-carboxylic acid derivatives of the formulae IIIa, IIIb, V, VIa or VIb with the diamines of the formula IV can be carried out in a manner known per se, preferably in an anhydrous organic solvent and with the exclusion of moisture, for example under nitrogen at temperatures between $-20°$ C. and $+50°$ C., particularly about $-15°$ C. to $+10°$ C.

Examples of suitable organic solvents are N,N-dimethylacetamide, N,N-diethylacetamide, N,N-dimethylformamide, N-methyl-2-pyrrolidone (NMP), N-acetyl-2-pyrrolidone, N-methyl-$\epsilon$-caprolactam, N,N,N',N'-tetramethylurea, tetrahydrothiophene dioxide (sulfolane) and dimethyl sulfoxide.

The reaction can also be carried out in mixtures of such solvents. On the other hand, it is also possible to dilute these preferred solvent systems with other organic, aprotic solvents, such as aromatic, cycloaliphatic or aliphatic hydrocarbons, if appropriate chlorinated hydrocarbons, for example toluene, xylenes, cyclohexane, pentane, hexane, petroleum ether, methylene dichloride, tetrahydrofuran, cyclohexanone and dioxane.

The polyamide blocks can also be prepared by interface polycondensation.

After the reaction is complete, the solvents can, if desired, be removed in a customary manner, for example by distillation, if appropriate under reduced pressure. If desired, the polyamide-polyamic acid block copolymers can be precipitated by methods known per se by pouring the reaction solution into a precipitant, such as water or aliphatic hydrocarbons, for example petroleum ether, but particularly methanol, isopropanol, acetone, symmetrical ethers of mono-, di- or triethylene glycol or acetonitrile, and can, if desired, be dried.

The cyclization of the polyamide-polyamic acid block copolymers to give the corresponding PAPI block copolymers is carried out by heating the polyamide-polyamic acid block copolymers at temperatures between 50° and 300° C., preferably without prior isolation, i.e. without further treatment in the reaction solution described above, or treating them with a dehydrating agent, on its own or mixed with a tertiary amine. Examples of suitable dehydrating agents are acetic anhydride or propionic anhydride or a mixture of acetic anhydride and triethylamine or pyridine. Processes of this type are described, for example, in U.S. Pat. Nos. 3,894,114, 4,124,651 or 4,503,285.

The compounds according to the invention can also be prepared by first synthesizing a polyamide block or polyamide-imide block in a manner known per se and then reacting the latter with a tetracarboxylic anhydride and a diamine to prepare the polyamide-polyamic acid block copolymer, which is then cyclized. The PAPI block copolymers according to the invention posses good solubility in aprotic, dipolar solvents which is suitable for the problem mentioned initially. Very good solubilities can be achieved, if appropriate with warming, in, for example, N,N-dimethylacetamide, N,N-dimethylformamide, N,N-dimethylacetamide, N-methyl-2-pyrrolidone, sulfolane, dimethyl sulfoxide or γ-butyrolactone.

It should be mentioned that a high concentration of the polymeric compounds is usually desirable. The solutions thus prepared are stable on storage, in contrast with the polyamide-polyamic acid precursor. The same also applies, of course, to the solid itself.

Solutions which are essentially free from by-products and residues of monomer can be prepared in this manner. Processing is carried out extremely simply, because no cyclization step has to be gone through and hence there is no elimination of water, which results in undesirable effects and damage to the end product. When the PAPI block copolymers according to the invention are used it is merely necessary to remove the solvent and the preparation of products of a high quality and high heat stability which can be used at high temperatures is possible.

In a subsequent stage or at the same time as the removal of the solvent, the copolymers according to the invention can be crosslinked by heating. The temperatures for the crosslinking step generally vary according to the copolymer used. As a rule the copolymers are heated above their glass transition temperature ($T_g$ value) or, in the case of more than one $T_g$ value, above their lowest $T_g$ value, especially above their highest $T_g$ value. $T_g$ values can be determined, for example, by differential scanning calorimetry (DSC), in which case the "onset value" [=point at which the prolonged base line cuts the tangent to the experimental curve in the region of steepest increase] is used. The term "glass transition temperature" relates to the values of the polymer in the particular formulation. These can be values which are below the values for the pure polymer. Thus, for example, polymers containing solvents and/or plasticizers can have $T_g$ values which are below the values for the pure polymer. As a rule, crosslinking is carried out at temperatures between 250° and 350° C.

The invention also relates, therefore, to a process for the preparation of crosslinked PAPI block copolymers, which comprises heating PAPI block copolymers containing DMCD radicals in the polyimide blocks at temperatures above their glass transition point. The invention also relates to the crosslinked products obtainable by this process.

The process according to the invention makes it possible to prepare coatings having large layer thicknesses or moulded articles in an advantageous manner, since curing by heat takes place uniformly within the whole crosslinkable material.

The block copolymers according to the definition are distinguished by good processability, and can be used for the manufacture of industrial products, such as fibres, fibre-reinforced composite materials, laminated articles, cast articles, laminates, matrix resins, honeycomb-core materials, lacquers, adhesives, foams, coating compositions, films, compression-moulding powders, sintering powders and compression-moulded articles.

In particular, the block copolymers according to the invention can be used for the production of coatings, films and flexible laminates or as adhesives, matrix resins or compression-moulding materials.

For this purpose customary additives can be added to the block copolymers before the crosslinking stage, such as pigments, fillers, electrical conductors, for example carbon black or metal particles, agents for increasing the abrasion resistance, lubricants or reinforcing fibres, such as carbon, boron or glass fibres.

Laminated articles containing the block copolymers according to the invention can, if desired, be provided with coating layers which improve the surface properties, for example layers composed of phenolic resins or aluminium, and they are used, inter alia, in aircraft construction.

Block copolymers according to the invention, preferably in the form of solutions, can also be used as coating compositions and adhesives, if desired with the addition of pigments such as titanium dioxide, customary fillers and foams, for coating and covering substrates of a very wide range of types in any desired form, such as films, fibres, fibre nonwovens, wires, lattice-like structures, fabrics or foams.

The following may be mentioned as suitable substrates: metals or alloys, such as copper, brass, aluminium, iron or steel; asbestos or glass fibre materials; polymers, such as cellulose materials (cellulose esters or ethers or paper); perfluorinated hydrocarbon polymers, for example polytetrafluoroethylene, polyolefins, polyesters, polyamides, polyimides or polyurethanes.

The following examples illustrate the invention.

SYNTHESIS EXAMPLE 1

Polyamic acid block: 70.71 g (0.2676 mol) of 5-(2,5-dioxotetrahydrofurfuryl)-3-methyl-3-cyclohexene-1,2-dicarboxylic anhydride (Epiclon B 4400 made by Dainippon Ink) and 224 g of N-methylpyrrolidone (NMP) are weighed out under nitrogen into a reaction vessel with a double jacket, connection for protective gas, internal thermometer, dropping funnel and stirrer. The reaction vessel is evacuated three times and flushed with nitrogen. The clear solution is cooled to −15° C. A solution of 45.95 g (0.2295 mol) of 4,4′-diaminodiphenyl ether in 347 g of NMP is added via the dropping funnel in the course of 70 minutes at −15° C. The reaction mixture is then allowed to warm up to room temperature and is stirred for a further 2 hours.

Polyamide-polyamic acid block copolymer: The clear reaction mixture is cooled again (−10°C.). 53.85 g (0.4980 mol) of m-phenylenediamine in 361 g of NMP are then added dropwise in the course of 75 minutes via the dropping funnel. Next 93.13 g (0.4582 mol) of isophthaloyl dichloride are added in portions at such a rate that the internal temperature does not exceed 0° C. About 75 minutes are required for this, and the solution becomes increasingly viscous. Finally, the polymer solution is stirred at room temperature for 30 minutes. A further 1.27 g (0.0063 mol) of isophthaloyl dichloride are added and the mixture is stirred for 1 hour to complete the polycondensation. 71.10 g (0.986 mol) of butylene oxide are then added in the course of 30 minutes via a dropping funnel (internal temperature 22° C.). This gives a solution of a polyamide-polyamic acid block copolymer which has an intrinsic viscosity of 1.01 dl/g (0.5% by weight solids content in NMP/25° C.).

Cyclization: The polyamide-polyamic acid block copolymer solution now present is then subjected to chemical cyclization to give the polyamide-polyimide block copolymer. This is effected by adding a mixture of 121.43 g (1.20 mol) of triethylamine and 145.80 g (1.2480 mol) of acetic anhydride via a dropping funnel in the course of 20 minutes at 25° C. The mixture is then stirred for further 8 hour at room temperature. The intrinsic viscosity (0.5% solids content, NMP; 25° C.) of a polyamide-polyimide block copolymer prepared in this way is 0.81 dl/g.

One part of the solution described above is diluted with the same amount of NMP, precipitated in a 10-fold amount of isopropanol and dried in vacuo in a drying cabinet. The temperature is increased in stages to 240° C. in the course of 72 hours and is kept at this temperature for 8 hours. After this drying process, the polymer is soluble in NMP to the extent of more than 30%. The intrinsic viscosity (0.5%, NMP, 25° C.) of the polymer is 0.67 dl/g.

Coating: A 25% by weight solution of the polyamide-polyimide block copolymer in NMP described above is applied to a copper foil by means of an applicator (height 200 μm). The bulk of the solvent is removed by IR irradiation for 15 minutes. The polymer layer of a test strip prepared in this way can be detached completely by immersion for 30 minutes in NMP. Another test strip is additionally heated in vacuo (15 mbar) from room temperature to 300° C. in the course of 30 minutes and is heated at this temperature for a further 30 minutes. This gives a flexible Cu foil with a bubble-free coating. The foil treated in this way is weighed, immersed in NMP for 30 minutes and weighed again. An unchanged weight is found in this test, i.e. the coating is no longer attacked by NMP. Similarly, the surface of the coating before and after the NMP treatment is unaltered.

SYNTHESIS EXAMPLES 2-5

The procedure described under Example 1 is followed and the starting materials listed in the following table are reacted with one another. Soluble polyamide-polyimide block copolymers are obtained. Their properties are described in the following table.

TABLE

Polyamide-polyimide block copolymers prepared analogously to Example 1

| No. | PI block | | PA block | |
|---|---|---|---|---|
| | Tetracarboxylic dianhydride (mol) | Diamine (mol) | Dicarboxylic dichloride (mol) | Diamine (mol) |
| 1 (Mol) | DMCD (0.2676) | DDE (0.2295) | IPC (0.4645) | mPDA (0.4980) |
| 2 (Mol) | DMCD (0.2500) | mDDS (0.1042) pDDS (0.1042) | IPC (0.3775) | mDDS (0.2084) pDDS (0.2084) |
| 3 (Mol) | DMCD (0.2404) | Diamine mixture (0.2004) | IPC (0.3657) | Diamine mixture (0.4037) |
| 4 (Mol) | DMCD (0.1052) BTDA (0.1052) | mXDA (0.091) pDDS (0.0917) | IPC (0.3657) | mPDA (0.3926) |
| 5 (Mol) | DMCD (0.1250) | DDE (0.1042) | IPC (0.1887) | DDE (0.2084) |

| No. | $\eta_{in}$ [dl/g] | | [°C.] | Solubility in NMP [%] after a drying temperature of 240° C. | Loss in weight [%] of coating after 30 minutes/300° C. and 30 minutes in NMP/20° C. |
|---|---|---|---|---|---|
| | PAPAS | PAPI | | | |
| 1 (Mol) | 1.01 | 0.67 | 278 | >30 | <0.2 |
| 2 (Mol) | 0.46 | 0.40 | 277 | >30 | 1 |
| 3 (Mol) | 0.59 | 0.52 | 215 | >30* | <0.2 |
| 4 (Mol) | 0.63 | 0.35 | 265 | >30 | <0.2 |
| 5 (Mol) | 1.66 | 1.06 | 265 | >30 | <0.2 |

*Drying temperature 200° C
DMCD 5-(2,5-dioxotetrahydrofurfuryl)-3-methyl-3-cyclohexene-1,2-dicarboxylic anhydride
BTDA 3,3',4,4'-benzophenonetetracarboxylic dianhydride
IPC isophthaloyldichloride
DDE 4,4'-diaminodiphenyl ether
pDDS 4,4'-diaminodiphenyl sulfone
mDDS 3,3'-diaminodiphenyl sulfone
mPDA m-phenylene diamine
mXDA m-xylylenediamine
Diamine mixture a technical product consisting of 4,4'-diaminodiphenylmethane, 3-ethyl-4,4'-diaminodiphenylmethane and 3,3'-diethyl-4,4'-diaminodiphenylmethane (M = 232)
Intrinsic viscosity 0.5% by weight of polymer in NMP at 25° C
Tg glass transition point determined by DSC; heating rate 20° C./minute

EXAMPLE 6

This example shows the good mechanical properties of a flexible laminate prepared with a PAPI block copolymer according to the invention.

A copper foil is coated with a 25% solution in N-methylpyrrolidone of the block copolymer according to Synthesis Example 5, using an applicator (200 μm). The coating is dried with IR radiation (Heraeus model MBS 225/125) for 45 minutes. The coated foil is then cut up into strips 1 cm long, and the "flex-life" of the laminate is determined [=number of flexings before the laminate breaks, determined by Universal-model 2 FDF Flex Ductility Tester (manufacturer: Universal Manufacturing Co.) using a tensile weight of 224 g and a 2 mm mandrel]. This gives an average value of 294 cycles for 5 test strips.

What is claimed is:

1. A polyamide-polyimide block copolymer soluble in aprotic dipolar solvents having an average molecular weight $M_n$ of 1,000–50,000, which has a ratio of amide to imide groups of about 4:1 to 1:4, these polymers in the imide blocks having a content of at least 2 mol %, of radicals of the formula

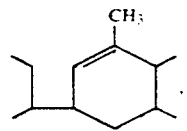

relative to the content of all the carboxylic acid radicals in the copolymer.

2. A block copolymer according to claim 1, containing combinations of blocks of the formulae IIb with Ia or Ic or of the formulae Ib with IIa or IIc

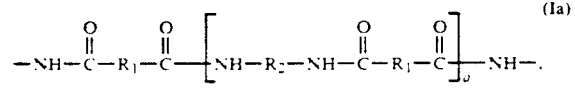 (Ia)

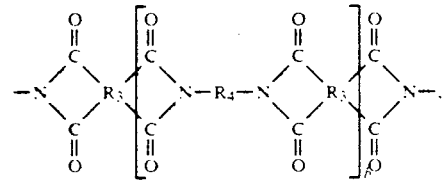 (Ib)

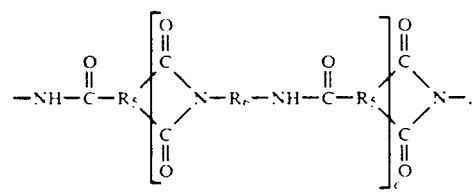 (Ic)

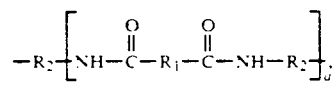 (IIa)

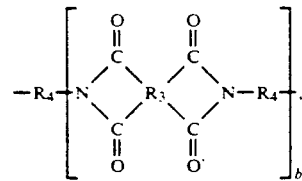 (IIb)

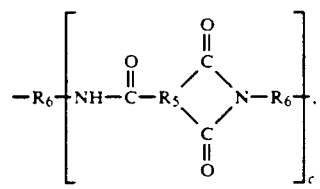 (IIc)

in which the indices a, b and c independently of one another are integers from 1 to 100, $R_1$ is a radical of the formulae $-C_nH_{2n}-$,

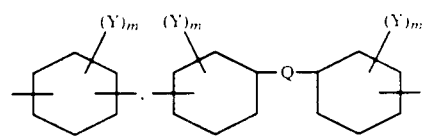

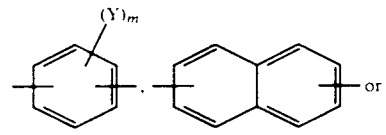

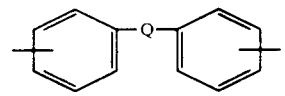

n is an integer from 2 to 12, m is an integer from 0 to 4, Y is alkyl or halogen, Q is a direct bond or $-CH_2-$, $-CH_2-CH_2-$, $-CH(CH_3)-$, $-C(CH_3)_2-$, $-C(CF_3)_2-$, $-O-$, $-S-$, $-SO_2-$ or $-CO-$, $R_2$ is a radical of the formulae $-C_nH_{2n}-$,

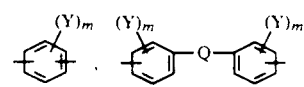

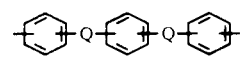

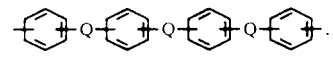

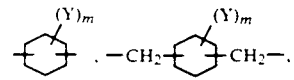

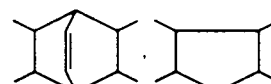

n, m, Y and Q has one of the meanings defined above, $R_3$ is a radical selected from the group consisting of

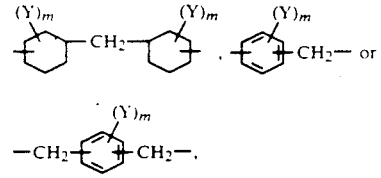

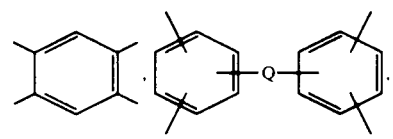

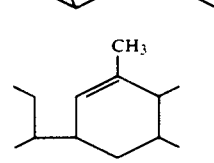

and mixtures thereof. Q has one of the meanings defined above. $R_5$ is a radical of the formula

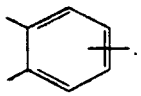

and $R_4$ and $R_6$ independently of one another have one of the meanings defined for $R_2$, with the proviso that 25-100 mol % of all the radicals $R_3$ have the formula

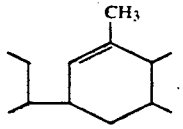

3. A block copolymer according to claim 2, wherein $R_3$ is a radical selected from the group consisting of

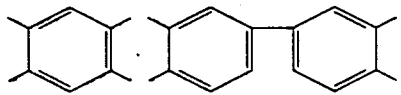

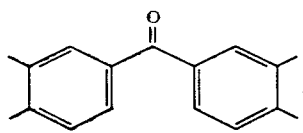

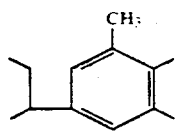

and mixtures thereof.

4. A block copolymer according to claim 2, which consists essentially of combinations of the blocks Ia and IIb or of the blocks Ib and IIa.

5. A block copolymer according to claim 2, wherein the index n is 6 to 12 and the index m is 1 or 0.

6. A block copolymer according to claim 2, wherein the index n is 6 to 12 and the index m is 0.

7. A block copolymer according to claim 2, wherein $R_1$ is 1,3-phenylene.

8. A block copolymer according to claim 2, wherein $R_2$, $R_4$ and $R_6$ are 1,3-phenylene,

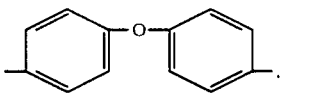

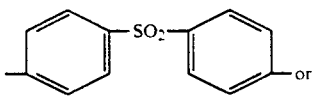

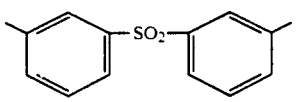

or a mixture of these radicals.

9. A block copolymer according to claim 2, wherein Q is $-CH_2-$, $-C(CH_3)_2-$, $-O-$, $-SO_2-$ or $-CO-$.

10. A block copolymer according to claim 2, wherein $R_3$ is a radical of the formula

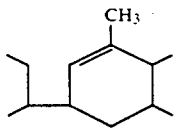

11. A block copolymer according to claim 2, wherein the proportion of the radicals $R_3$ of the formula

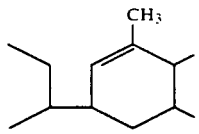

in the polyimide blocks is 50 to 100 mol %, relative to the proportion of tetracarboxylic acid radicals in these blocks.

12. A process for the preparation of a crosslinked polyamide-polyimide block copolymer, which comprises heating PAPI block copolymers containing radicals of the formula

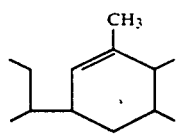

in the polyimide blocks at temperature above their glass transition point.

13. Coatings, films, flexible laminates, adhesives, composite materials or compression-moulding obtained by thermal crosslinking the polyamide-polyimide block copolymers according to claim 1.

* * * * *